(12) United States Patent
Beaudoin et al.

(10) Patent No.: US 6,485,006 B1
(45) Date of Patent: Nov. 26, 2002

(54) PLUG WITH SAFETY MEANS FOR USE WITH COUNTERBALANCING SYSTEMS OF GARAGE DOORS AND THE LIKE

(75) Inventors: Michel Beaudoin, Drummondville (CA); Pierre-Louis Foucault, St-Lambert (CA); Luc Bourassa, St-Majorique (CA); Gérard Dubé, Lyster (CA); Martin Harnois, Ste-Julie (CA)

(73) Assignee: Canimex Inc., Quebec (CA)

( * ) Notice: Subject to any disclaimer, the term of this patent is extended or adjusted under 35 U.S.C. 154(b) by 26 days.

(21) Appl. No.: 09/616,767

(22) Filed: Jul. 14, 2000

Related U.S. Application Data
(60) Provisional application No. 60/144,038, filed on Jul. 16, 1999.

(30) Foreign Application Priority Data

Jul. 16, 1999 (CA) .............................................. 2277646

(51) Int. Cl.⁷ ................................................. B29D 23/00
(52) U.S. Cl. .................... 267/155; 428/34.1; 16/DIG. 7
(58) Field of Search ............... 428/34.1, 35.7, 428/36.9; 242/375; 267/155, 179; 226/4.21, 284; 160/191, 201; 49/200; 16/DIG. 1, DIG. 7, 198

(56) References Cited

U.S. PATENT DOCUMENTS 2,774,507 A * 12/1956 Hurley ...................... 220/284
3,779,537 A * 12/1973 Kalister ...................... 267/179
4,930,182 A * 6/1990 Eichenberger ............... 16/198
5,239,777 A * 8/1993 Husselton ..................... 49/200
6,174,575 B1 * 1/2001 Foucault et al. ........... 428/34.1
6,263,541 B1 * 7/2001 Scates ........................ 16/198

* cited by examiner

Primary Examiner—Christopher P. Schwartz
(74) Attorney, Agent, or Firm—Merchant & Gould P.C.

(57) ABSTRACT

A plug mounted at one end of a torsional spring operatively connected to an overhead shaft of a counterbalancing mechanism of a garage door, wherein the plug comprises projecting interlocking means able to cooperate with corresponding matching means of a mating part of the counterbalancing mechanism, so that when the interlocking means of the plug are inserted into the corresponding matching means and when tension is applied to the torsional spring, the interlocking means interlock with said matching means of the mating part, thereby preventing the plug from being readily removed therefrom. The projecting interlocking means thus act as safety means because they provide an automatic locking mechanism which make the plug operate as a safety device as well. Hence, the plug according to the present invention has a dual purpose, that is, it can operate as a conventional plug, whether it be stationary or winding, as well as a safety device for the counterbalancing mechanism with which it cooperates, because of its projecting interlocking means.

15 Claims, 6 Drawing Sheets

PLUG WITH SAFETY MEANS FOR USE WITH COUNTERBALANCING SYSTEMS OF GARAGE DOORS AND THE LIKE

This App. claims benefit of Prov. No. 60/144,038 filed Jul. 16, 1999.

FIELD OF THE INVENTION

The present invention relates to a plug, also known as a "collar" or an "anchor", such as the ones used for operatively connecting torsion springs to overhead shafts of counterbalancing mechanisms used for garage doors and the like, in order to allow a torque transfer between the torsion spring and the overhead shaft so as to counterbalance such cable operated doors. More particularly, the present invention relates to a plug comprising safety means which interlock with a mating part of the counterbalancing mechanism when tension is applied to the torsional spring, so as to prevent the plug from being readily removed therefrom in order to avoid serious injuries to unexperienced or inadvertent users tampering with the plug when tension is still present in the torsional spring.

BACKGROUND OF THE INVENTION

It is known in the art that large, vertical, cable operated doors, such as commercial and residential sectional garage doors, usually require counterbalancing mechanisms to counterbalance the weight of the door in order to decrease the force required to open the door and also facilitate its closing from a raised to a lowered position. Large sectional garage doors used in commercial and residential applications may be manually or power operated. In either case, but particularly for manually operated doors, counterbalancing mechanisms have been used for many years to counterbalance the weight of the door and control its opening and closing movements so that one person can easily control the operation of the door. Counterbalancing mechanisms are also advantageous for power operated overhead doors since they reduce the power requirements needed for the motor and they lower the structural strength required for the opening and closing mechanism of the door. In other words, lighter weight, lower cost, door controlling mechanisms may be used if a counterbalancing mechanism is connected to the door to assist it in its opening and closing movements. Furthermore, the provision of a counterbalancing mechanism minimizes the chance of a rapid and uncontrolled closing of the door in the event of failure of one of the components of the door controlling mechanism, which can result in personal injury or damage to property.

It is also known in the art that a widely used type of counterbalancing mechanism generally comprises a pair of spaced apart cable drums connected to flexible cables, each cable being in turn connected to a lower opposite side edge of the garage door. The cable drums are usually mounted on an overhead shaft which is supported above the door opening and is connected to one or more torsion springs which are each fixed to the shaft at one end, and secured to the wall at the other end, so that the cable drums are biased to rotate in a direction which winds the cables onto the drums and counteracts the weight of the door connected to the cables. Generally, conventional counterbalancing mechanisms include two torsion springs which are coaxially mounted onto the overhead shaft and which are opposed to one another. Furthermore, the torsion springs are adjusted by applying tension therein to properly balance the weight of the door so that minimal opening and closing efforts are required, either manually or when motor controlled. The two drums which are used for winding the cables are usually fastened at each opposite end of the overhead shaft and are fixed to the same by means of screws, whose respective ends are in contact with the shaft and exert pressure thereon.

It is also known in the art that conventional, low cost adjustment devices used for the above-mentioned type of counterbalance mechanisms, and widely utilized in the garage door industry, are generally cylindrical "collars" commonly referred to also as "plugs" (or "cones") which are connected to the so-called fixed ends of the torsion springs and are mounted on the aforementioned shaft for adjusting the deflection of the springs to preset the counterbalance force. That is, each torsion spring is usually coaxially mounted onto the overhead shaft and is preferably connected with a stationary plug at one end and a winding plug at the other end. Usually, stationary plugs are connected to a fixed structure, such as for example, a support bracket rigidly mounted to the wall. Moreover, winding plugs are usually removably fixed to the overhead shaft and are used to operatively connect the torsion spring to the overhead shaft so as to allow a torque transfer between the latter two. Hence, the above-mentioned plugs ensure a mechanical connection between each opposite end of the torsional spring and the support or a shaft, depending on whether they are respectively stationary plugs or winding plugs. The winding plugs usually include one or more setscrews which lock the plugs to the shaft to prevent rotation therewith except during adjustment of the spring deflection. The winding plugs also include sockets for receiving winding bars whereby the springs are manually preset, or "preloaded", by rotating the winding plugs with respect to the shaft using the winding bars and then locking the winding plugs to the shaft with the setscrews.

An important problem associated with the aforementioned type of counterbalancing mechanisms, or with any other type of counterbalancing mechanism which uses similar plugs (also known as "anchors") and tensioning springs is that they constitute a serious injury hazard for unexperienced or inadvertent workers which tamper with said plugs. This arises from the fact that when the cable operated doors are closed, the torsion springs, which are under considerable tension, and the plugs, whether stationary or winding, are readily accessible. It has been experienced that several people, either due to unexperience or inadvertence or any other reason leading to human error, have unscrewed either one of the plugs, or the support bracket for that matter, without taking the necessary precautions, which has resulted in severe personal injuries given the considerable tension present in the torsional spring. The abovedescribed problem is inherent to the plugs known in the art because they are not provided with safety means for preventing such adverse consequences. Therefore, it would be useful to provide a plug which comprises safety means devised so as to prevent the plug from being readily removed when tension is present in the torsional spring.

Another major problem is that none of the types of plugs known in the art provide a simple, quick, reliable, and cost effective way for operatively connecting a torsion spring to an overhead shaft of a counterbalancing mechanism used for garage doors and the like, while further acting as a safety device for said counterbalancing mechanism with which they cooperate. Therefore, it would be useful to provide a simpler, more reliable, easier to use, easier to maintain, safer, quicker, and more cost effective plug which is devised for both operatively connecting a torsion spring to an overhead shaft and for acting also as a safety device for the cable-operated door counterbalancing mechanism with which it cooperates.

SUMMARY OF THE INVENTION

The object of the present invention is to provide a "plug", also knows as a "collar", an "anchor", or a "cone", which satisfies each of the above-mentioned needs.

More particularly, a first object of the present invention is to provide a plug which comprises safety means devised so as to prevent the plug from being readily removed when tension is present in the torsional spring.

A second object of the present invention is to provide a simpler, more reliable, easier to use, easier to maintain, safer, quicker, and more cost effective plug which is devised for both operatively connecting a torsion spring to an overhead shaft and for acting also as a safety device for the cable-operated door counterbalancing mechanism with which it cooperates.

In accordance with the present invention, the above objects are achieved with a plug mounted at one end of a torsional spring operatively connected to an overhead shaft of a counterbalancing mechanism, wherein the plug comprises projecting interlocking means able to cooperate with corresponding matching means of a mating part of the counterbalancing mechanism, so that when the interlocking means of the plug are inserted into the corresponding matching means and when tension is applied to the torsional spring, the interlocking means interlock with said matching means of the mating part, thereby preventing the plug from being readily removed therefrom.

More particularly, the above objects are achieved by a plug mounted at one end of a torsional spring operatively connected to an overhead shaft of a counterbalancing mechanism, the plug comprising:

- a cylindrical collar coaxially mounted onto the overhead shaft, said collar comprising connecting means for connecting the end of the torsional spring onto the collar;
- at least one flange projecting longitudinally along the shaft from the collar, said at least one flange being insertable into and cooperable with an aperture of a mating part of the counterbalancing mechanism so as to be interlocked with said aperture when tension is applied to the torsional spring;
- wherein said at least one flange comprises a hook-shaped ridge, whereby when tension is applied to the torsional spring, the plug rotates about the overhead shaft so that said ridge interlocks with a corresponding matching notch of the aperture.

Preferably, the plug comprises two flanges, each flange comprising a hook-shaped ridge, whereby when the tension is applied to the torsional spring, the plug rotates about the overhead shaft so that each corresponding ridge interlocks with a corresponding matching notch of each corresponding aperture.

The objects, advantages and other features of the present invention will become more apparent upon reading of the following non-restrictive description of a preferred embodiment thereof, given for the purpose of exemplification only with reference to the accompanying drawings.

DETAILED DESCRIPTION OF A PREFERRED EMBODIMENT OF THE INVENTION

In the following description, the same numerical references refer to similar elements. The embodiments shown in FIGS. 2–9 are preferred. In the context of the present description, the expressions "plug", "collar", "anchor", and any other equivalent expression known in the art (such as "cone" for example) used to designate those structures employed to operatively connect torsion springs onto overhead shafts of counterbalancing mechanisms used for garage doors and the like will be used interchangeably. Although the present invention was primarily designed for a counterbalancing mechanism of a garage door, it may be used for counterbalancing mechanisms of other kinds of doors, such as slidable truck doors, or with any other items suspended by a cable, as apparent to a person skilled in the art. For this reason, the expression "garage door" should not be taken as to limit the scope of the present invention and includes all other kinds of doors or items with which the present invention may be useful. Hence, also in the context of the present invention, the expressions "garage door" and "cable operated door" will be used interchangeably as well.

The plug 1 according to the preferred embodiment of the invention as it is illustrated with accompanying drawings is a plug 1 mounted at one end 3 of a torsional spring 5 operatively connected to an overhead shaft 7 of a counterbalancing mechanism 9, wherein the plug 1 comprises projecting interlocking means 11 able to cooperate with corresponding matching means 13 of a mating part 15 of the counterbalancing mechanism 9, so that when the interlocking means 11 of the plug 1 are inserted into the corresponding matching means 13 and when tension is applied to the torsional spring 5, the interlocking means 11 interlock with said matching means 13 of the mating part 15, thereby preventing the plug 1 from being readily removed therefrom. The plug 1, also known as a "collar", an "anchor", and a "cone", as aforementioned, is preferably devised for use in counterbalancing mechanisms 9 of cable operated doors 17, such as garage doors 17 and the like. Preferably also, the plug 1 is mounted at the end 3 of the torsional spring 5 operatively connected to the overhead shaft 7 of the counterbalancing mechanism 9 in order to allow a torque transfer between the torsional spring 5 and the overhead shaft 7 so as to counterbalance the cable operated door 17, the plug 1 further acting as a safety device because of its projecting interlocking means 11 which, as mentioned earlier, are devised to cooperate with corresponding matching means 13 of the mating part 15 of the counterbalancing mechanism 9, so that when the interlocking means 11 of the plug 1 are inserted into the corresponding matching means 13 and when tension is applied to the torsional spring 5, the interlocking means 11 interlock with the matching means 13 of the mating part 15, thereby preventing the plug 1 from being readily removed therefrom. The projecting interlocking means 11 thus act as safety means because they provide an automatic locking mechanism which makes the plug 1 further operate as a safety device. Hence, the plug 1 according to the present invention has a dual purpose, that is, it can act as a conventional plug 1, whether it be "stationary" 1a or "winding" 1b, as well as a safety device for the counterbalancing mechanism 9 with which it cooperates, because of its projecting interlocking means 11. The projecting interlocking means 11 may sometimes be referred to as "ear means" because of the ear-shaped form of their preferred embodiment shown in the accompanying drawings.

Figure 1:
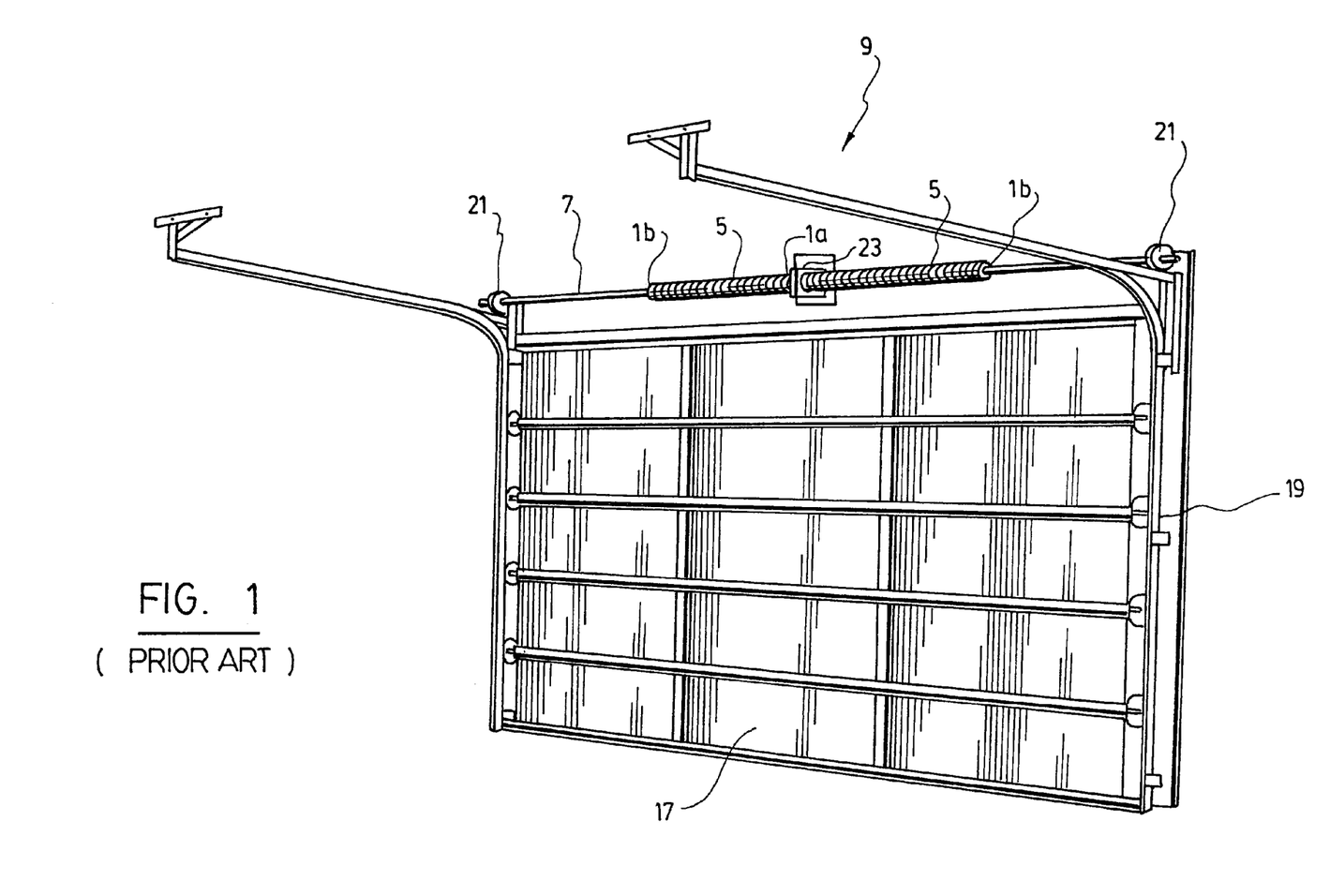
FIG. 1 is a perspective view of a sectional garage door connected to a counterbalancing mechanism provided with stationary and winding plugs according to the prior art.

Referring to FIG. 1, most cable operated garage doors 17, whether manually or power operated, are connected to an overhead counterbalancing mechanism 9 that provides a counterbalancing force in order to decrease the force required to open the door 17 and also facilitate its closing. The garage door 17 is usually connected to the counterbalancing mechanism 9 by means of two cables 19, one at the right and one at the left (not shown). The cables 19 are usually made of steel and the lower free end of each cable 19 is usually attached at the bottom of the door 17. As illustrated in FIG. 1, each cable 19 cooperates with a corresponding cable drum 21 which is mounted to the overhead shaft 7 in order to facilitate raising and lowing of the cable operated door 17. Torque is transferred between the torsion spring 5 and the overhead shaft 7 by means of plugs 1 which operatively connect the shaft 7 to the spring 5 in order to counterbalance the weight of the garage door 17. Usually, each torsion spring 5 is fixed to the overhead shaft 7 at one end, by means of a plug 1 known as a "winding plug" 1b, and secured to the wall, or a support bracket 23 fixed thereon, at the other end, by means of another plug 1 known as a "stationary plug" 1a. The above-mentioned types of counterbalancing mechanisms 9 can be found in other types of cable operated doors 17, such as slidable truck doors for example.

According to the present invention and as better shown in FIGS. 2 to 10, the plug 1, whether it is a stationary plug 1a or a winding plug 1b, comprises projecting interlocking means 11 devised to cooperate with corresponding matching means 13 of a mating part 15 of the counterbalancing mechanism 9, so that when the interlocking means 11 of the plug 1 are inserted into the corresponding matching means 13 and when tension is applied to the torsional spring 5, the interlocking means 11 interlock with said matching means 13 of the mating part 15, thereby preventing the plug 1 from being readily removed therefrom.

Figure 2:
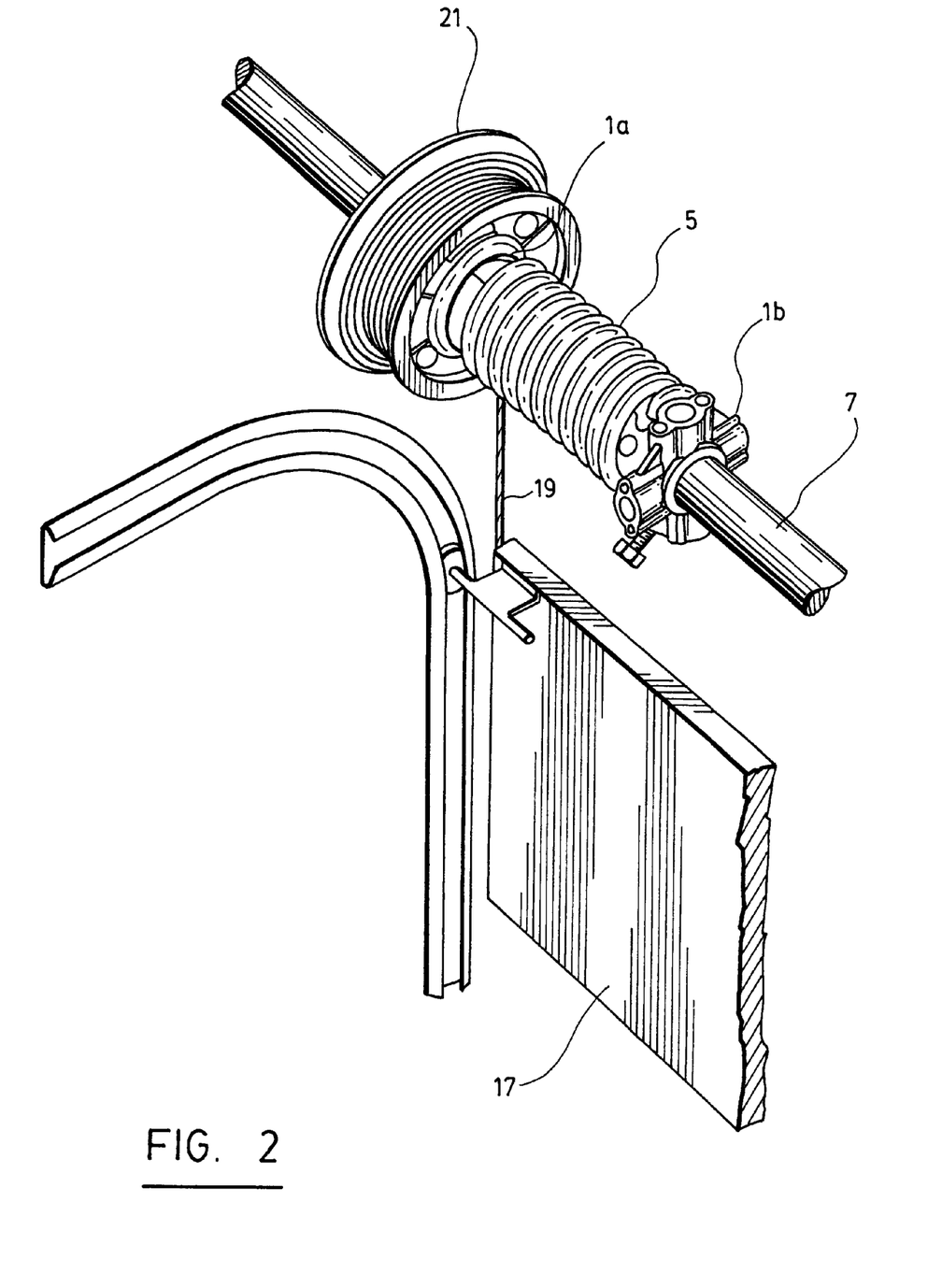
FIG. 2 is a partial perspective view of a sectional garage door connected to a counterbalancing mechanism provided with a stationary plug and a winding plug according to preferred embodiments of the invention, said stationary and winding plugs being shown coaxially mounted about the overhead shaft and each plug cooperating with a free end of the torsion spring, the stationary plug being provided with safety means cooperating with a drum acting as the mating part of the counterbalancing mechanism.
Figure 3:
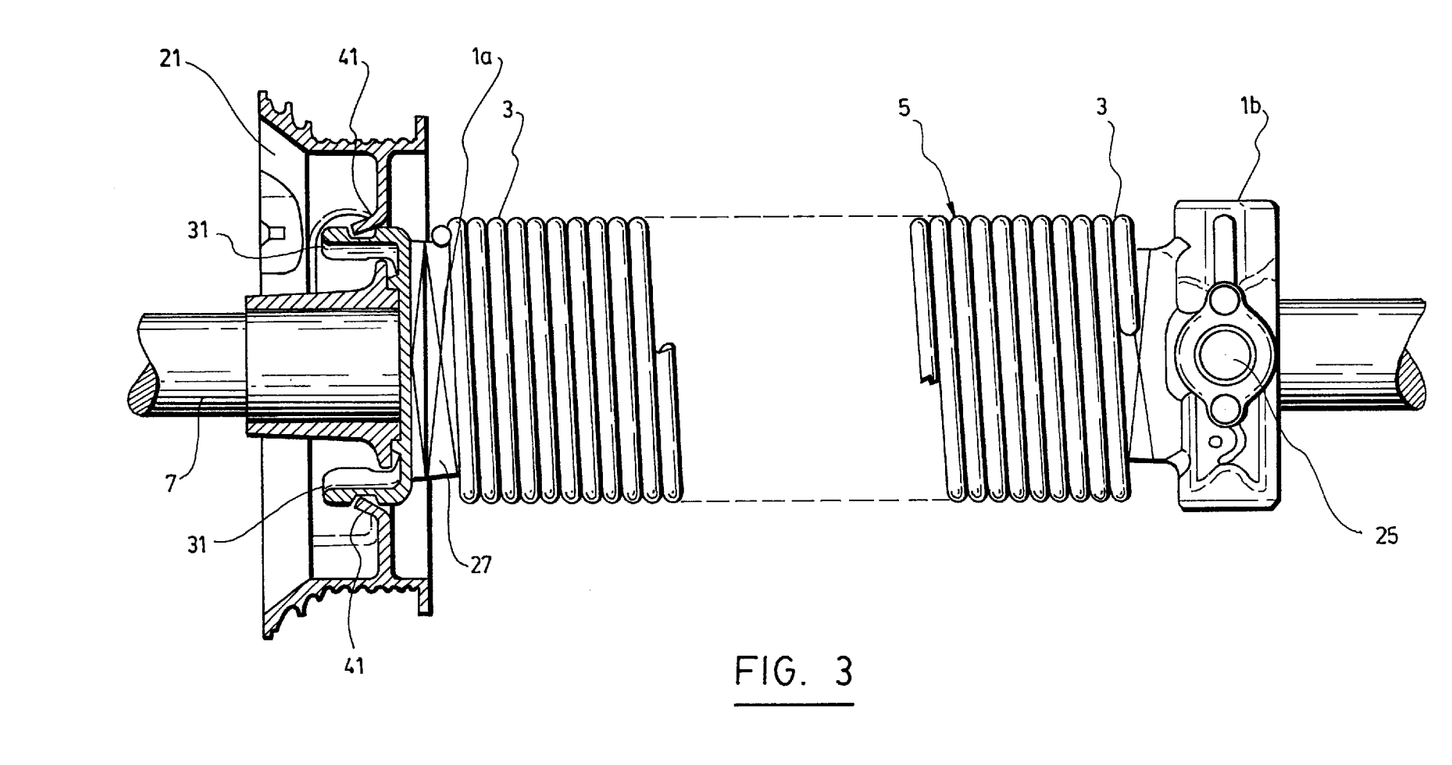
FIG. 3 is a cross-sectional view of a portion of what is shown in FIG. 2.

According to a preferred embodiment of the invention and as better shown in FIGS. 2 and 3, each torsion spring 5 is preferably coaxially mounted onto the overhead shaft 7 and is preferably connected with a stationary plug 1a at one end 3, and a winding plug 1b at the other end 3. The stationary plug 1a of FIGS. 2 and 3 is shown provided with projecting interlocking means 11 according to the preferred embodiment of the invention, these projecting interlocking means 11 being shown cooperating with a drum 21 acting as the mating part 15 of the counterbalancing mechanism 9. It is worth noting that the mating part 15 may consist of other types of devices, as apparent to a person skilled in the art, depending on the applications for which plug 1 and mating part 15 are intended for. For example, as in the case of other counterbalancing mechanisms 9, the mating part 15 for the stationary plug 1a may consist of a support bracket 23 securely mounted to a fixed structure, such as a wall. The essence of the invention lies in that the plug 1, whether stationary 1a or winding 1b, comprises projecting interlocking means 11 as described hereinabove, whatever may be their embodiment, which enable the plug 1 to cooperate as a safety device, in addition to fulfilling its conventional function.

As also shown in FIGS. 2 and 3, the winding plug 1b is preferably removably fixed to the overhead shaft 7 and is used to operatively connect the torsion spring 5 to the overhead shaft 7 so as to allow a torque transfer between the latter two. Preferably, the collar of the winding plug 1b is provided with sockets 25 for receiving winding bars in order to manually preset a given torque onto the torsion spring, prior to securing the winding plug 1b onto the overhead shaft 7, by rotating the winding plug 1b with respect to the overhead shaft 7. Once an appropriate amount of torque ("preload") has been applied to the torsion spring 5 in order to allow an appropriate counterbalancing force as apparent to a person skilled in the art, the winding plug 1b is preferably secured to the shaft 7 by means of setscrews provided for that purpose in order to prevent any substantial rotational relative movement between the winding plug 1b and the shaft 7, in order to assure a good torque transfer between the torsion spring 5 and the overhead shaft 7. Preferably, the winding plug 1b may allow an appropriate relative sliding of the corresponding spring end 3 attached thereon so as to compensate for the contraction or extension of the spring 5 in function of the torsion torque. It is worth noting that, although not shown in the accompanying drawings, the winding plug 1b, similarly to the stationary plug 1a and as aforementioned, may also comprise projecting interlocking means 11 according to the present invention so as to act as a safety device by cooperating with a corresponding mating part 15 when tension is still present in the torsional spring 5. For example, as in the case of other counterbalancing mechanisms 9, the mating part 15 for the winding plug 1b may consist of a drum 21 securely mounted to the overhead shaft 7.

Because conventional plugs, whether stationary or winding, can be easily removed from the overhead shaft 7, for maintenance and/or repair of the counterbalancing mechanism 9, by unfastening their setscrews, the projecting interlocking means 11 of the present invention enable the plugs 1 to provide an automatic locking mechanism, so that when the torsional spring 5 is placed under tension, the plug 1 is locked into the mating part 15, preventing tampering with and removal of the plug 1, thereby preventing injuries to workers.

As also shown in FIGS. 2 and 3, the plug 1 preferably comprises a cylindrical collar 27 coaxially and slidably mounted onto the overhead shaft 7, the collar 27 comprising a connection means 29 for connecting the end 3 of the torsional spring 5 thereon. The projecting interlocking means 11 may consist of at least one flange 31 projecting longitudinally along the shaft 7 from the collar 27, said at least one flange 31 being able to be inserted into and cooperate with an aperture 33 of the mating part 15 so as to be interlocked therewith when tension is applied to the torsional spring 5. It is to be understood however, as apparent to a person skilled in the art, that the projecting interlocking means 11 may take on various other embodiments without departing from the scope of the invention. Furthermore, it is worth noting that the manner in which the plug 1 is mounted onto the overhead shaft 7 and the way of connecting the plug 1 to the torsional spring 5 may also take on various other embodiments.

Figures 4, 6:
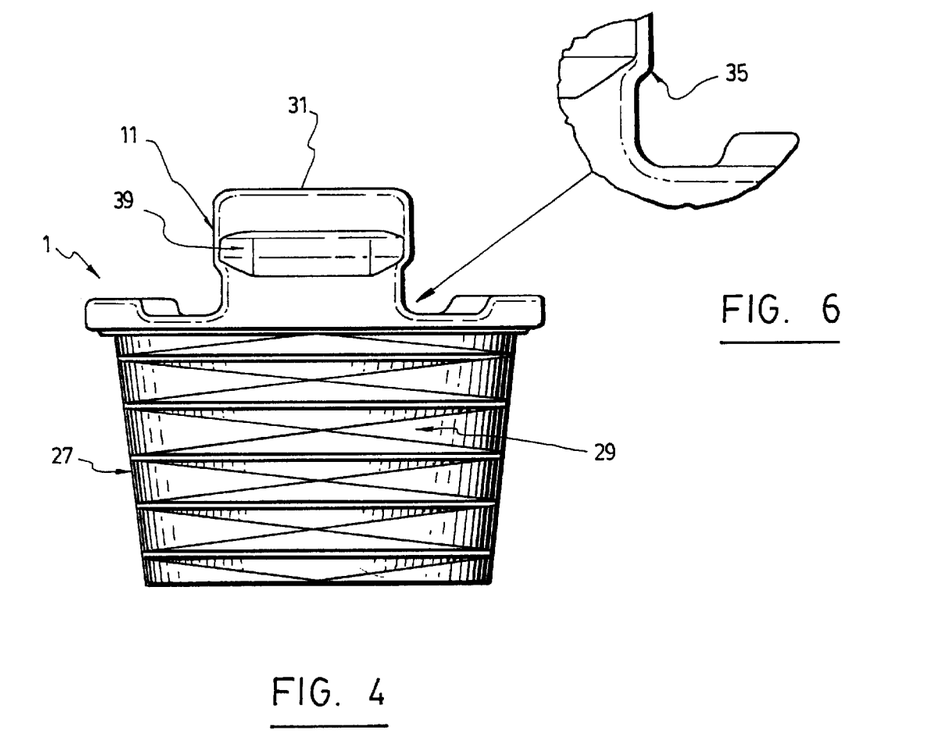
FIG. 4 is a side elevational plan view of the stationary plug shown in FIG. 2.
FIG. 6 is a detailed view of a portion of the stationary plug shown in FIG. 4.
Figure 5:
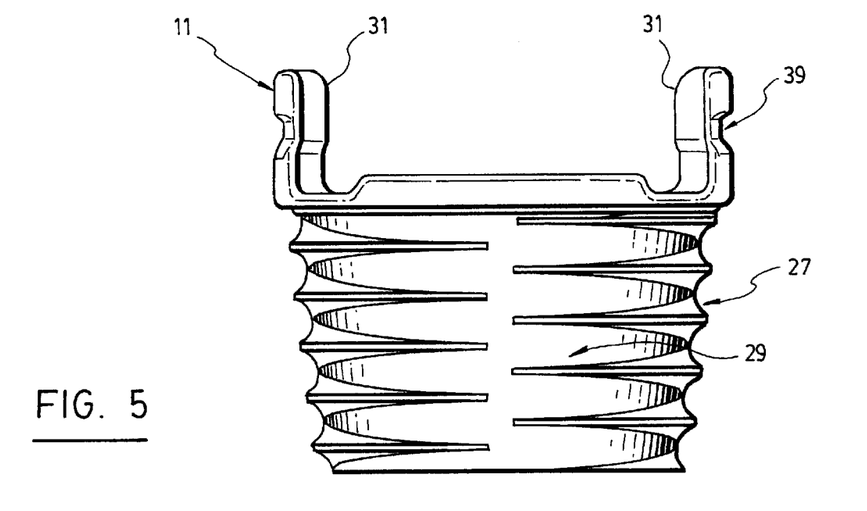
FIG. 5 is another side elevational plan view of the stationary plug shown in FIG. 2.
Figure 7:
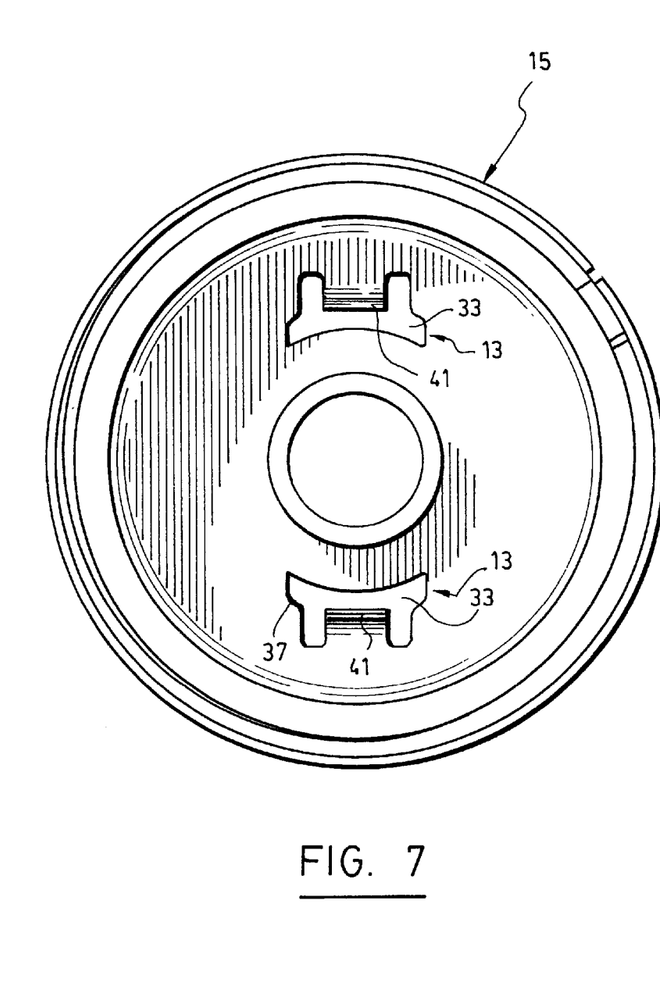
FIG. 7 is a top plan view of the drum shown in FIG. 2, said drum acting as a mating part according to a preferred embodiment of the invention.
Figure 8:
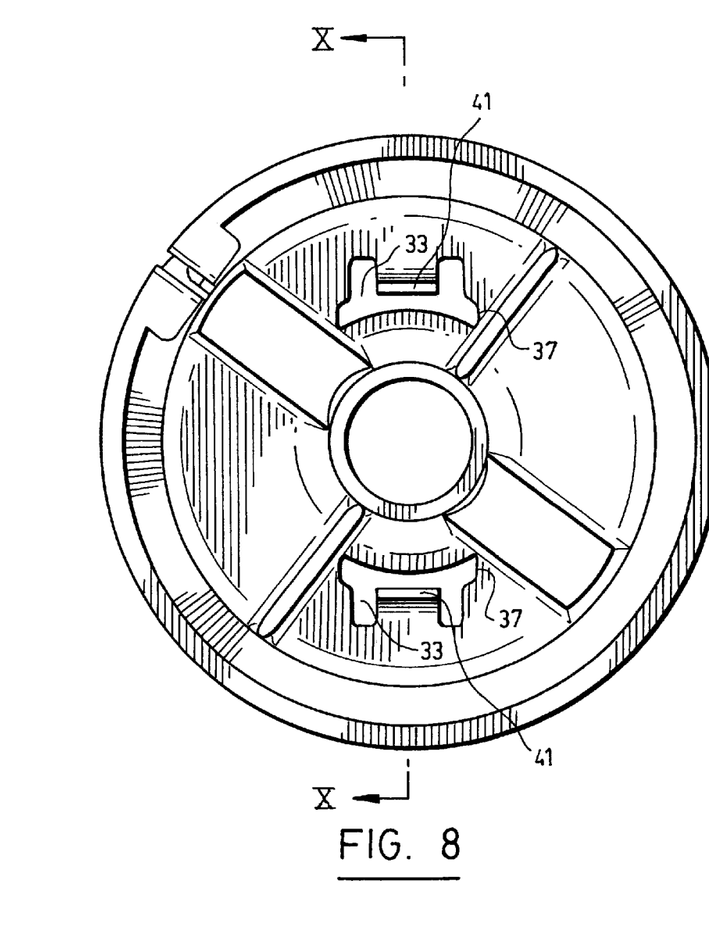
FIG. 8 is a rear plan view of what is shown in FIG. 7.
Figure 9:
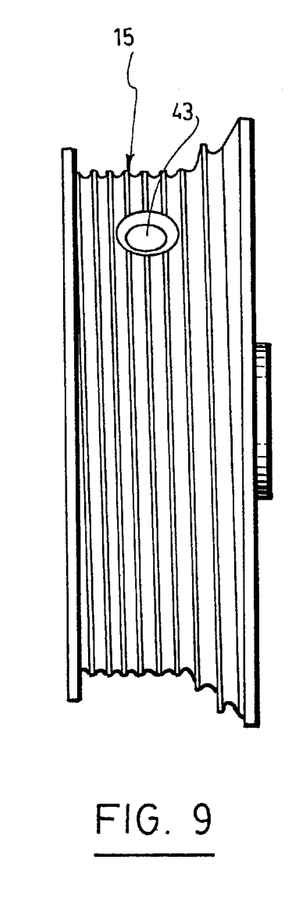
FIG. 9 is a side elevational plan view of what is shown in FIG. 7.
Figure 10:
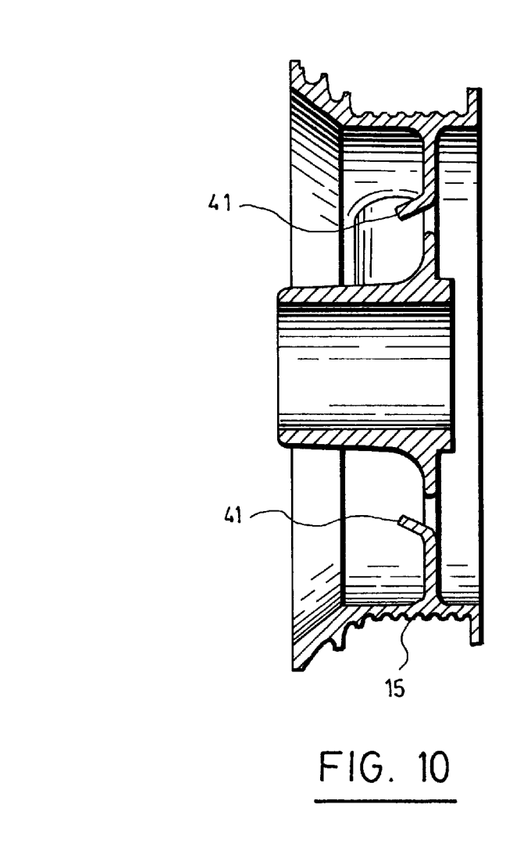
FIG. 10 is a cross-sectional view of the mating part of FIG. 8 taken along section AA.

As aforementioned and as better shown in FIGS. 4 to 6, the present invention is characterized in that the plug 1 comprises projecting interlocking means 11 able to cooperate with corresponding matching means 13 of the mating part 15 of the counterbalancing mechanism 9, so that when the interlocking means 11 of the plug 1 are inserted into the corresponding matching means 13 and when tension is applied to the torsional spring 5, the interlocking means 11 interlock with the matching means 13 of the mating part 15, thereby preventing the plug 1 from being readily removed therefrom. Thus, the projecting interlocking means 11 effectively operate as safety means, making the plug 1 act as a safety device in addition to allowing it, whether stationary 1a or winding 1b, to fulfill its conventional role. As better shown in FIGS. 4 and 5, the projecting interlocking means 11 preferably consist of two flanges 31 projecting longitudinally along the shaft 7 from the collar 27, each flange 31 being able to be inserted into and cooperate with the corresponding aperture 33 of the mating part 15 so as to be interlocked therewith when tension is applied to the torsional spring 5. It is worth noting that the plug 1 may comprise more than two flanges 31, preferably symmetrically disposed thereon, depending on the application for which it is intended, as apparent to a person skilled in the art. As better shown in FIG. 6, each flange 31 comprises a hook-shaped ridge 35, whereby when tension is applied to the torsional spring 5, the plug 1 rotates about the overhead shaft 7 so that each corresponding ridge 35 interlocks with a corresponding matching notch 37 of the corresponding aperture 33, the matching notches 37 of the corresponding apertures 33 being better shown in FIGS. 7, 8, and 10. Preferably, once the projecting interlocking means 11 of the plug 1 are interlocked with the matching means 13, they cannot be removed from the mating part 15 without removing tension in the torsional spring 5. This feature enables the risk of inadvertently dismantling the plug 1 from the counterbalancing mechanism 9 to be considerably reduced, if not completely eliminated, and consequently the risk of personal injury is also reduced. Preferably also, each flange 31 further comprises a groove 39 cooperating with a corresponding projecting clip 41 of the mating part 15 so as to secure positioning of the plug 1 inside the mating part 15 upon insertion of each flange 31 into the corresponding aperture 33, as better shown in FIG. 3. As shown in FIG. 9, the mating part 15 preferably has fastening means 43 for mounting the mating part 15 onto an appropriate location, such as the overhead shaft 7 or the support bracket 23 for example, depending on the function of the mating part 15 and of the plug 1. Preferably and as better shown in FIG. 3, a portion of the torsional spring 5 comprising the end 3 thereof is coaxially mounted onto the cylindrical collar 27. Furthermore, the connecting means 29 preferably consist of, that is, the collar 27 preferably further comprises external threading for facilitating insertion and positioning of the plug 1 into the above-mentioned portion of the torsional spring 5, the external threading being better shown in FIGS. 4 and 5.

The present invention is an improvement and presents several advantages over other plugs 1 known in the prior art, such as the one illustrated in FIG. 1. For instance and as shown hereinabove, in addition to enabling the plug 1, whether stationary 1a or winding 1b, to fulfill its conventional function, the projecting interlocking means 11 of the plug 1 according to the present invention act as safety means, thus providing an automatic locking mechanism preventing the plug 1 from being readily removed from the mating part 15 when tension is still present in the torsional spring 5, thus preventing serious injuries to inexperienced or inadvertent workers tampering with the plugs 1. Hence, the invention has a dual function, that of acting as a conventional plug, whether stationary 1a or winding 1b, and as a safety device. Furthermore, the present invention may be used in the garage door industry, with counterbalancing mechanisms 9 of new garage doors 17 or existing garage doors 17. As it is evident from reading the above description, the present invention is a simpler, more reliable, easier to use, easier to maintain, safer, quicker and more cost effective plug 1 which is devised for both operatively connecting a torsion spring 5 to an overhead shaft 7 and for acting as a safety device for the cable-operated door counterbalancing mechanism 9 with which it cooperates. Moreover, the present invention may be used with other kinds of doors 17, such as slidable truck doors 17, or with any other items suspended by a cable, as apparent to a person skilled in the art.

Of course, numerous modifications could be made to the above-described embodiments without departing the scope of the invention as defined in the appended claims.

What is claimed is:

1. A plug mounted at one end of a torsional spring operatively connected to an overhead shaft of a counterbalancing mechanism, the plug comprising:

a cylindrical collar coaxially mounted onto the overhead shaft, said collar comprising connecting means for connecting the end of the torsional spring onto the collar; and at least one flange projecting longitudinally along the shaft from the collar, said at least one flange being insertable into and cooperable with an aperture of a mating part of the counterbalancing mechanism so as to be interlocked with said aperture when tension is applied to the torsional spring;

wherein said at least one flange comprises a hook-shaped ridge, whereby when tension is applied to the torsional spring, the plug rotates about the overhead shaft so that said ridge interlocks with a corresponding matching notch of the aperture.

2. A plug according to claim 1, wherein said at least one flange comprises a groove cooperating with a projecting clip of the mating part so as to secure positioning of the plug inside the mating part upon insertion of said at least one flange into the aperture.

3. A plug according to claim 2, wherein a portion of the torsional spring comprising the end thereof is coaxially mounted onto the cylindrical collar.

4. A plug according to claim 3, wherein the collar further comprises external threading for facilitating insertion and positioning of the plug into said portion of the torsional spring.

5. A plug according to claim 4, wherein the plug is a stationary plug.

6. A plug according to claim 5, wherein the mating part is a drum securely mounted to the overhead shaft.

7. A plug according to claim 5, wherein the mating part is a support bracket securely mounted to a fixed structure.

8. A plug according to claim 4, wherein the plug is a winding plug.

9. A plug according to claim 8, wherein the mating part is a drum securely mounted to the overhead shaft.

10. A plug mounted at one end of a torsional spring operatively connected to an overhead shaft of a counterbalancing mechanism, the plug comprising:
- a cylindrical collar coaxially mounted onto the overhead shaft, said collar comprising connecting means for connecting the end of the torsional spring onto the collar; and
- two flanges projecting longitudinally along the shaft from the collar, each flange being insertable into and cooperable with a corresponding aperture of a mating part of the counterbalancing mechanism so as to be interlocked with said aperture when tension is applied to the torsion spring;
- wherein each flange comprises a hook-shaped ridge, whereby when the tension is applied to the torsional spring, the plug rotates about the overhead shaft so that each corresponding ridge interlocks with a corresponding matching notch of each corresponding aperture.

11. A plug according to claim 10, wherein each flange comprises a groove cooperating with a corresponding projecting clip of the mating part so as to secure positioning of the plug inside the mating part upon insertion of each flange into the corresponding aperture.

12. A plug according to claim 11, wherein a portion of the torsional spring comprising the end thereof is coaxially mounted onto the cylindrical collar.

13. A plug according to claim 12, wherein the collar further comprises external threading for facilitating insertion and positioning of the plug into said portion of the torsional spring.

14. A plug according to claim 13, wherein the plug is a stationary plug.

15. A plug according to claim 14, wherein the plug is a winding plug.

* * * * *